(12) United States Patent
Kim et al.

(10) Patent No.: US 7,769,277 B2
(45) Date of Patent: *Aug. 3, 2010

(54) RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

(75) Inventors: Hyung Sun Kim, Seoul (KR); Kang Soo Seo, Kyunggi-do (KR); Byung Jin Kim, Kyunggi-do (KR)

(73) Assignee: LG Electronics Inc., Gyeonggi-do (KR)

( * ) Notice: Subject to any disclaimer, the term of this patent is extended or adjusted under 35 U.S.C. 154(b) by 800 days.

This patent is subject to a terminal disclaimer.

(21) Appl. No.: 10/898,207

(22) Filed: Jul. 26, 2004

(65) Prior Publication Data
US 2005/0019019 A1 Jan. 27, 2005

(30) Foreign Application Priority Data

Jul. 24, 2003 (KR) .......................... 10-2003-050948
Jul. 25, 2003 (KR) .......................... 10-2003-051252

(51) Int. Cl.
*H04N 5/00* (2006.01)
*H04N 5/93* (2006.01)
*H04N 5/91* (2006.01)
*H04N 7/00* (2006.01)
*G11B 27/00* (2006.01)

(52) U.S. Cl. .......................... 386/126; 386/52; 386/55; 386/82; 386/95; 386/125; 386/98

(58) Field of Classification Search ......... 386/125–126, 386/52, 55, 82, 95, 98
See application file for complete search history.

(56) References Cited

U.S. PATENT DOCUMENTS

| 4,040,088 | A | 8/1977 | Hannan |
| 5,519,443 | A | 5/1996 | Salomon et al. |
| 5,949,752 | A | 9/1999 | Glynn et al. |
| 5,999,225 | A | 12/1999 | Yagasaki et al. |

(Continued)

FOREIGN PATENT DOCUMENTS

CN 1385857 A 12/2002

(Continued)

OTHER PUBLICATIONS

ETSI EN 300 743: Digital Video Broadcasting (DVB); Subtitling System, Oct. 2002.*

(Continued)

*Primary Examiner*—Thai Tran
*Assistant Examiner*—Daquan Zhao
(74) *Attorney, Agent, or Firm*—Harness, Dickey & Pierce

(57) ABSTRACT

In the data structure for managing reproduction of text subtitle data, a text subtitle information area stores at least one text subtitle information segment. The text subtitle information segment is represented by a single PES packet of transport packets. In one embodiment, the text subtitle information segment includes an identifier identifying the text subtitle information segment as a text subtitle information segment.

14 Claims, 8 Drawing Sheets

U.S. PATENT DOCUMENTS

| | | | |
|---|---|---|---|
| 6,115,077 A | 9/2000 | Tsukagoshi | |
| 6,204,883 B1 | 3/2001 | Tsukagoshi | |
| 6,219,043 B1 | 4/2001 | Yogeshwar et al. | |
| 6,253,221 B1 | 6/2001 | Kim | |
| 6,259,858 B1 | 7/2001 | Ando et al. | |
| 6,275,457 B1 | 8/2001 | Maeda | |
| 6,288,900 B1 | 9/2001 | Johnson et al. | |
| 6,288,990 B1 | 9/2001 | Fujiie et al. | |
| 6,381,513 B1* | 4/2002 | Takase et al. | 700/231 |
| 6,452,609 B1 | 9/2002 | Katinsky et al. | |
| 6,477,185 B1* | 11/2002 | Komi et al. | 370/536 |
| 6,763,178 B1 | 7/2004 | Suzuki et al. | |
| 7,197,234 B1* | 3/2007 | Chatterton | 386/95 |
| 7,324,119 B1 | 1/2008 | Puri et al. | |
| 2001/0030710 A1 | 10/2001 | Werner | |
| 2002/0006271 A1* | 1/2002 | Winter et al. | 386/95 |
| 2002/0106193 A1 | 8/2002 | Park et al. | |
| 2002/0194618 A1 | 12/2002 | Okada et al. | |
| 2003/0021586 A1 | 1/2003 | Suh | |
| 2003/0156504 A1 | 8/2003 | Kanegae et al. | |
| 2003/0202431 A1 | 10/2003 | Kim et al. | |
| 2003/0235406 A1 | 12/2003 | Seo et al. | |
| 2004/0001699 A1 | 1/2004 | Seo et al. | |
| 2004/0081434 A1* | 4/2004 | Jung et al. | 386/95 |
| 2004/0101285 A1 | 5/2004 | Seo et al. | |
| 2005/0008339 A1 | 1/2005 | Kuroiwa et al. | |
| 2005/0147387 A1 | 7/2005 | Seo et al. | |
| 2005/0201718 A1 | 9/2005 | Kato | |
| 2006/0153532 A1* | 7/2006 | McCrossan et al. | 386/95 |
| 2006/0288302 A1 | 12/2006 | Yahata et al. | |
| 2007/0127885 A1 | 6/2007 | Seo et al. | |
| 2008/0253734 A1 | 10/2008 | Kang et al. | |

FOREIGN PATENT DOCUMENTS

| | | | |
|---|---|---|---|
| CN | 1428770 A | | 7/2003 |
| CN | 1985857 | | 6/2007 |
| EP | 0737009 | | 10/1996 |
| EP | 0737979 | | 10/1996 |
| EP | 0 791 925 | | 8/1997 |
| EP | 0791925 | | 8/1997 |
| EP | 0 942 609 | A1 | 9/1999 |
| EP | 1198132 | A1 | 4/2002 |
| EP | 1204280 | | 5/2002 |
| EP | 1 280 347 | A1 | 1/2003 |
| EP | 1 408 505 | | 4/2004 |
| EP | 1 553 769 | A1 | 7/2005 |
| EP | 1614108 | | 1/2006 |
| EP | 1 643 765 | | 4/2006 |
| GB | 1 556 366 | | 11/1979 |
| GB | 1 586 431 | | 3/1981 |
| JP | 60-179261 | | 9/1985 |
| JP | 08-273304 | | 10/1996 |
| JP | 09-035458 | | 2/1997 |
| JP | 11-176137 | | 7/1999 |
| JP | 2001-135066 | | 5/2001 |
| JP | 2002-025197 | | 1/2002 |
| JP | 2002-101389 | | 4/2002 |
| JP | 2002-158971 | | 5/2002 |
| JP | 2002-247526 | | 8/2002 |
| JP | 2003-134440 | | 5/2003 |
| JP | 2003-249057 | | 9/2003 |
| JP | 2003-283942 | | 10/2003 |
| RU | 2196389 | C2 | 1/2003 |
| RU | 2229174 | C2 | 5/2004 |
| TW | 1238391 | | 8/2005 |
| WO | WO 99/22516 | | 5/1999 |
| WO | WO02075739 | A1 | 9/2002 |
| WO | WO 03/056560 | A1 | 7/2003 |
| WO | WO 2004/030356 | A1 | 4/2004 |
| WO | WO 2004/034398 | | 4/2004 |
| WO | WO 2004/036574 | | 4/2004 |
| WO | WO 2004/056105 | | 7/2004 |
| WO | WO 2004/066281 | | 8/2004 |
| WO | WO 2004/090885 | | 10/2004 |
| WO | WO 2004/093064 | | 10/2004 |
| WO | WO 2004/098186 | A1 | 11/2004 |
| WO | WO 2005/074394 | | 8/2005 |
| WO | WO 2005/074399 | | 8/2005 |

OTHER PUBLICATIONS

"*Digital Video Broadcasting (DVB); Subtitling Systems*", ETSI Standards, European Telecommunications Standards Institute, Sophia-Antipo, FR, vol. BC, No. V121, Jun. 2002, XP014001876.

WC3 Synchronized Multimedia Integration Language (SMIL) 1.0 Specification, Jun. 15, 1998.

European Search Reports dated Apr. 23, 2007 and Aug. 28, 2007 and International Search Report dated Nov. 6, 2004.

Taiwan Official Letter of Pending Patent Application Under Examination with English Translation dated Aug. 15, 2008.

Russian Office Action dated Aug. 20, 2008.

English Translation of Russian Office Action dated Oct. 30, 2008 for corresponding Russian Application No. 2006116489/28 (017941).

Blu-Ray Disc, White Paper Blu-ray Disc Format, Blu-ray Disc Association, Mar. 2005, pp. 1-35.

Pages 30 and 31 of European Search Report dated Jan. 31, 2005.

Russian Office Action dated Feb. 18, 2009 with English translation.

Japanese Office Action dated May 8, 2009 with English Translation.

Russian Office Action dated May 18, 2009 with English Translation.

Russian Office Action dated May 28, 2009 with English Translation.

Office Action for U.S. Appl. No. 10/960,485, dated Sep. 3, 2009.

Notice of Allowance for European patent application No. 05 721 896.8 dated Jun. 3, 2009.

"Information technology—Generic coding of moving pictures and associated audio information: Systems," International Standard, ISO/IEC 13818-1, second edition, Dec. 1, 2000.

Japanese Office Action dated Sep. 15, 2009 (with English translation).

Search Report for European patent application No. 04774776 dated Dec. 28, 2009.

"W3C synchronized multimedia integration language (SMIL) 1.0 specification," Internet Citation, Jun. 15, 1998, XP002957990 [retrieved on Oct. 28, 2002].

Blu-Ray Disc Founders: "White paper Blu-Ray Disc Format: 2.B Audio Visual Application format specifications for BD-ROM," Internet Citation, Aug. 2004, XP002315435, retrieved from the Internet: URL:http://www.blu-raydisc.com/assets/downloadablefile/2b_bdrom_audiovisualapplication-12841.pdf>, [retrieved on Jan. 23, 2005].

Office Action for U.S. Appl. No. 10/960,485, dated Feb. 22, 2010.

Office Action for Chinese patent application No. 200480030092.2 dated Jan. 29, 2010 (in English).

Office Action for Japanese patent application No. 2006-535258 dated Mar. 12, 2010 (with Englsih translation).

Office Action for U.S. Appl. No. 11/070,238, dated Nov. 25, 2009.

* cited by examiner

FIG. 3

Page Composition Segment Syntax

```
page_composition_segment () {
    segment_type
    segment_length
    page_time_out
    page_version_number
    page_state
    CLUT_id
    number_of_object_entries
    if (i=0; i<number_of_object_entries; i++) {
        object_id
        is_object_cropping
        object_horizontal_address
        object_vertical_address
        if (is_object_cropping) {
            object_horizontal_cropping
            object_vertical_cropping
            object_cropping_width
            object_cropping_height
        }
    }
}
```

FIG. 4

CLUT Definition Segment Syntax

```
CLUT_definition_segment () {
    segment_type
    segment_length
    CLUT_id
    for (color_index=0; color_index <256; color_index++)
        CLUT_entry_id
        Y-value
        Cr-value
        Cb-value
        T-value
        }
    }
}
```

FIG. 5

Object Data Segment Syntax

```
Object_data_segment ( ) {
    segment_type
    segment_length
    last_in_sequence
    object_data_piece ( ) {
        object_id
        object_type
        object_source
        object_width
        object_height
        do{ run_length_code
        } while (run_length_code ! = '0 x0000)
    }
}
```

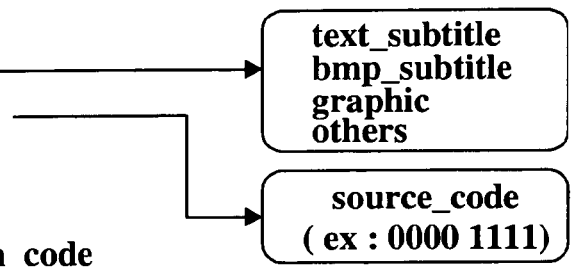

text_subtitle
bmp_subtitle
graphic
others source_code
( ex : 0000 1111 )

FIG. 6

End of Display set Segment Syntax

```
end_of_display_set_segment () {
    segment_type
    reserved
    segment_length
}
```

FIG. 12

Page Composition Segment Syntax

```
page_composition_segment () {
        segment_type
        segment_length
        page_time_out
        page_version_number
        page_state
        CLUT_id
        number_of_object_entries
        if (i=0; i<number_of_object_entries; i++) {
                object_id
                object_type       ──────→   text_subtitle
                object_source     ─────┐    bmp_subtitle
                is_object_cropping     │    graphic
                object_horizontal_address┘  others
                object_vertical_address ──→ source_code
                if (is_object_cropping) {   ( ex : 0000 1111)
                        object_horizontal_cropping
                        object_vertical_cropping
                        object_cropping_width
                        object_cropping_height
                }
        }
}
```

RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

FOREIGN PRIORITY DATA

The subject application claims priority under 35 U.S.C. 119 on Korean Application No. 10-2003-050948 filed Jul. 24, 2003 and Korean Application No. 10-2003-051252 filed Jul. 25, 2003; the entire contents of both applications are hereby incorporated by reference.

BACKGROUND OF THE INVENTION

1. Field of the Invention

The present invention relates to a high-density recording medium such as a Blu-ray Disc-ROM (BD-ROM) and associated methods and apparatuses of recording and reproducing.

2. Description of the Related Art

Optical disks capable of storing large amounts of high-quality digital video/audio data such as DVDs (digital versatile disks) and DVD recording/reproducing apparatuses are now commercially available on the market.

Subtitle data such as caption or logo data to be superimposed on main video data of a DVD is recorded thereon as graphic data. An optical disk reproducing apparatus reproduces the subtitle graphic data and main video data of the DVD and displays the main video data and subtitle data together on the screen of an external display apparatus connected to the optical disk reproducing apparatus.

A user of such an optical disk reproducing apparatus, therefore, can view the main video data of a DVD overlaid with related subtitle data (e.g., caption or logo images) using a display apparatus connected to the optical disk reproducing apparatus.

In the mean time, the standardization of new high-density optical disks having higher storage capacity than a DVD has been progressing rapidly. The Blu-ray Disk ROM (BD-ROM) is an example of such new optical disks. An effective method for managing and reproducing subtitle data and graphic image data of the BD-ROM is not yet available.

SUMMARY OF THE INVENTION

A recording medium according to the present invention includes a data structure for managing reproduction of text subtitle data.

In one embodiment, the recording medium stores at least one text subtitle information segment. The text subtitle information segment is represented by a single PES packet of transport packets. The text subtitle information segment includes an identifier identifying the text subtitle information segment as a text subtitle information segment.

In another embodiment, the recording medium stores at least one PES packet. The PES packet includes transport packets representing a text subtitle information segment. The text subtitle information segment includes an identifier identifying the text subtitle information segment as a text subtitle information segment.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention.

In the drawings:

FIG. 3 illustrates an example embodiment of the data structure for a page composition segment recorded on a high-density recording medium in accordance with the present invention;

FIG. 4 illustrates an example embodiment of the data structure for a color definition segment recorded on a high-density recording medium in accordance with the present invention;

FIG. 5 illustrates an example embodiment of the data structure for an object data segment recorded on a high-density recording medium in accordance with the present invention;

FIG. 6 illustrates an example embodiment of the data structure for an end of display set segment recorded on a high-density recording medium in accordance with the present invention;

FIG. 12 illustrates another exemplary embodiment of the data structure for a page composition segment recorded on a high-density recording medium in accordance with the present invention.

DETAILED DESCRIPTION OF THE EXEMPLARY EMBODIMENTS

In order that the invention may be fully understood, exemplary embodiments thereof will now be described with reference to the accompanying drawings.

Figure 1:
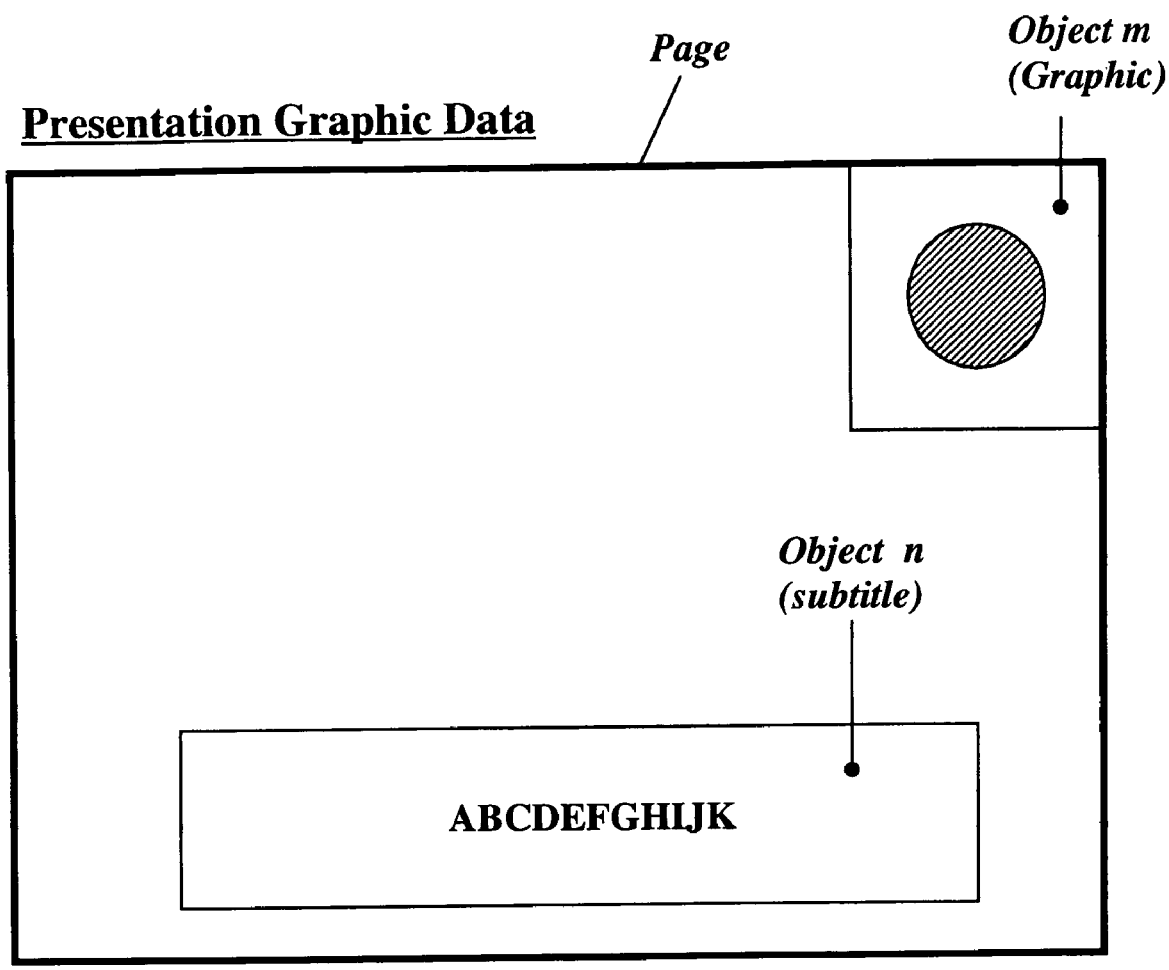
FIG. 1 illustrates an example of a plurality of objects displayed in a page in accordance with the present invention.

According to the present invention, a plurality of objects of presentation graphic data may be included in one page. For example, up to two objects may be displayed in one page as shown in FIG. 1. An object of presentation graphic data recorded on a BD-ROM disk may be recorded as text subtitle data, BMP (bit map) subtitle data, graphic image data, etc. Each object defines a region of presentation graphic data.

Figure 2:
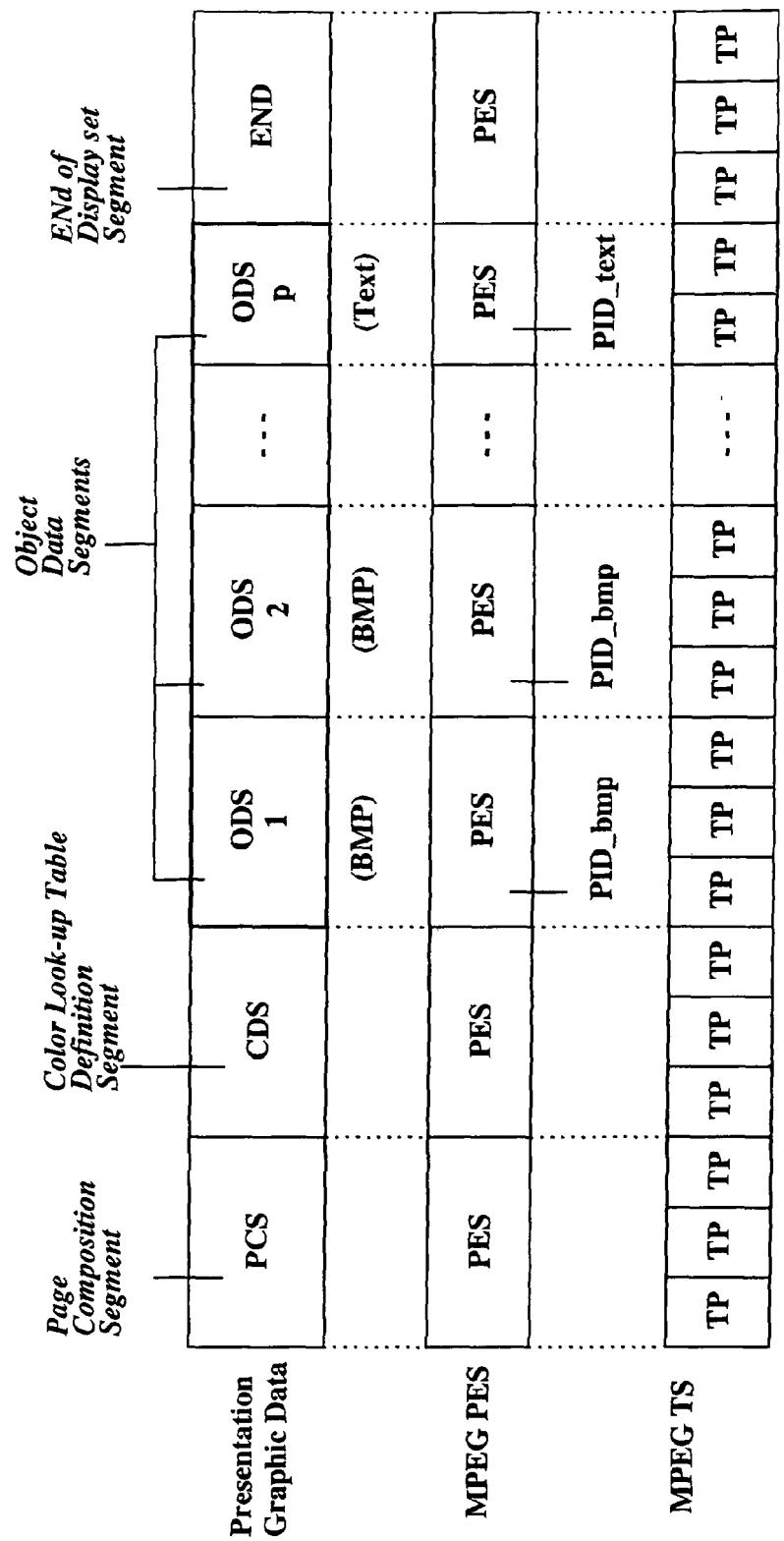
FIG. 2 illustrates presentation graphic data recorded on a high-density optical disk in accordance with the present invention.

Text subtitle data, BMP subtitle data, or graphic image data corresponding to each of the objects is recorded as an object data segment (ODS). At least one object data segment (ODS) may be managed along with one page composition segment (PCS), one color lookup table definition segment (CDS), and one end of display set segment (END) in a hierarchical way as shown in FIG. 2. Each of the above-mentioned segments will be described in detail below.

Each segment in the hierarchical structure is first organized into an MPEG packetized elementary stream (PES) packet and again organized into MPEG transport packets (TPs) before being recorded on a BD-ROM. Namely, each segment (e.g., PCS, CDS, ODS, etc.) is represented by one PES packet. A unique packet ID corresponding to the data type of the object data segment (ODS) is written into the corresponding PES packet. For example, if the object data segment is BMP subtitle data, a unique packet ID, PID_bmp, is written into the corresponding PES packet. Likewise, if the object data segment is text subtitle data, a unique packet ID, PID_text, is written into the corresponding PES packet. The optical disk apparatus for reproducing the BD-ROM, therefore, identifies the data type of each PES packet by examining the packet ID written in the PES packet. The presentation graphic data and main audio/video streams are multiplexed into a single transport stream and stored as a single file.

FIG. 3 illustrates an example embodiment of the data structure for a page composition segment recorded on a high-density recording medium in accordance with the present invention. As shown, the page composition segment (PCS) includes information regarding a segment type, a segment length, a page time-out, a page version number and a page state. The segment type is information for indicating that the segment is a page composition segment (PCS). The segment length indicates the length of the segment. The page time-out is information indicative of when to remove buffering data of the corresponding page from a buffer in a reproducing apparatus. The page version number indicates the version of this PCS. The page state indicates the state of the PCS (e.g., only updating the CDSs linked to the ODSs).

The page composition segment (PCS) also includes a color lookup table ID (CLUT_id), and an indicator of the number of object entries. The CLUT ID indicates the identifier of a CLUT and CDSs having the same CLUT ID are linked to the PCS. For each object entry (i.e., each region of presentation graphic data), the PCS also includes an object ID, an object cropping flag (is_object_cropping), and object horizontal/vertical addresses. The object ID indicates the identifier of an object and links each ODS having that object ID (discussed in detail below) to the PCS. In this manner, ODSs and CDSs may be linked together by the CLUT ID and object ID given in the PCS. The object horizontal/vertical addresses indicate the position of the object on the presentation page (e.g., such as shown in FIG. 1).

If the object cropping flag (is_object_cropping) is set to '1', the object cropping flag information may include object horizontal/vertical cropping data and object cropping width/height data. The object horizontal/vertical cropping data and the object cropping width/length data are recorded for partially displaying an object image. Specifically, the object horizontal/vertical cropping information specify the position of a cropping rectangle (the cropping area) having the dimensions provided by the object cropping width/length. Only that much of the object lying within the cropping rectangle will be displayed.

FIG. 4 illustrates an example embodiment of the data structure for a color lookup table definition segment recorded on a high-density recording medium in accordance with the present invention. As shown in FIG. 4, the color lookup table definition segment (CDS) includes a segment type, a segment length, and a color lookup table ID (CLUT_id). The segment type identifies the segment as a CDS, and the segment length indicates the length of the CDS. The CLUT ID information indicates a family of CLUTs to which the CDS belongs. As will be described in detail below, the CDS provides a single color definition. The family of CLUTs provides a color palette from which to select color definitions.

The color lookup table definition segment may further include information regarding color lookup table entry ID, a brightness value (Y-value), a red chrominance value (Cr-value), a blue chrominance value (Cb-value), and a transparency value (T-value). Accordingly, when linked to an object by a PCS, these values control color attributes of the displayed object such as luminance or brightness, chrominance (Cr and Cb) and transparency. The CLUT entry ID identifies the entry of this CDS in the family of CLUTs (identified by the CLUT ID) to which this CDS belongs.

FIG. 5 illustrates an example embodiment of the data structure for an object data segment recorded on a high-density recording medium in accordance with the present invention. As shown, the object data segment (ODS) includes a segment type, a segment length, and a last-in sequence. The segment type is information for indicating that the segment is an object data segment (ODS). The segment length indicates the length of the segment. The last-in sequence information indicates whether this is a last ODS needed to reproduce the object for which the ODS provides object data. As will be appreciated, it may take more than one ODS's worth of object data to form the object.

The object data segment (ODS) further includes an object ID, an object type, an object source, an object width, an object height, and run-length code, etc. The object type indicates whether the object data segment is a text subtitle segment, BMP subtitle segment, BMP graphic segment, etc. Namely, the object type identifies the type of data represented by the object data segment. For example, object type values '0000 0001', '0000 0010', and '0000 0100' represent graphic image data, BMP subtitle data, and text subtitle data, respectively.

The object source is information for indicating that the object is recorded on a BD-ROM disk or not. An optical disk apparatus for reproducing the BD-ROM may determine whether an object to be presented as presentation graphic data is an object recorded on the BD-ROM or downloaded through a network such as the Internet. For example, an object source code of '0000 1111' may be recorded to indicate that the BD-ROM disk is the object source. Both or either of the object type information and the object source information may be included in the corresponding object data segment.

The object width indicates the width of the object, and the object height indicates the height of the object. The run-length code provides the bit map data in run-length coded format if the object is a bit map object. If the object is a text subtitle, then character codes may be provided.

FIG. 6 illustrates an example embodiment of the data structure for an end of display set segment recorded on a high-density recording medium in accordance with the present invention. As shown, the end of display set segment (END) includes a segment type, a reserved portion and a segment length. The segment type indicates the segment is an end of display set segment. The reserved portion is reserved for future use, and the segment length indicates the length of the segment.

Figure 7:
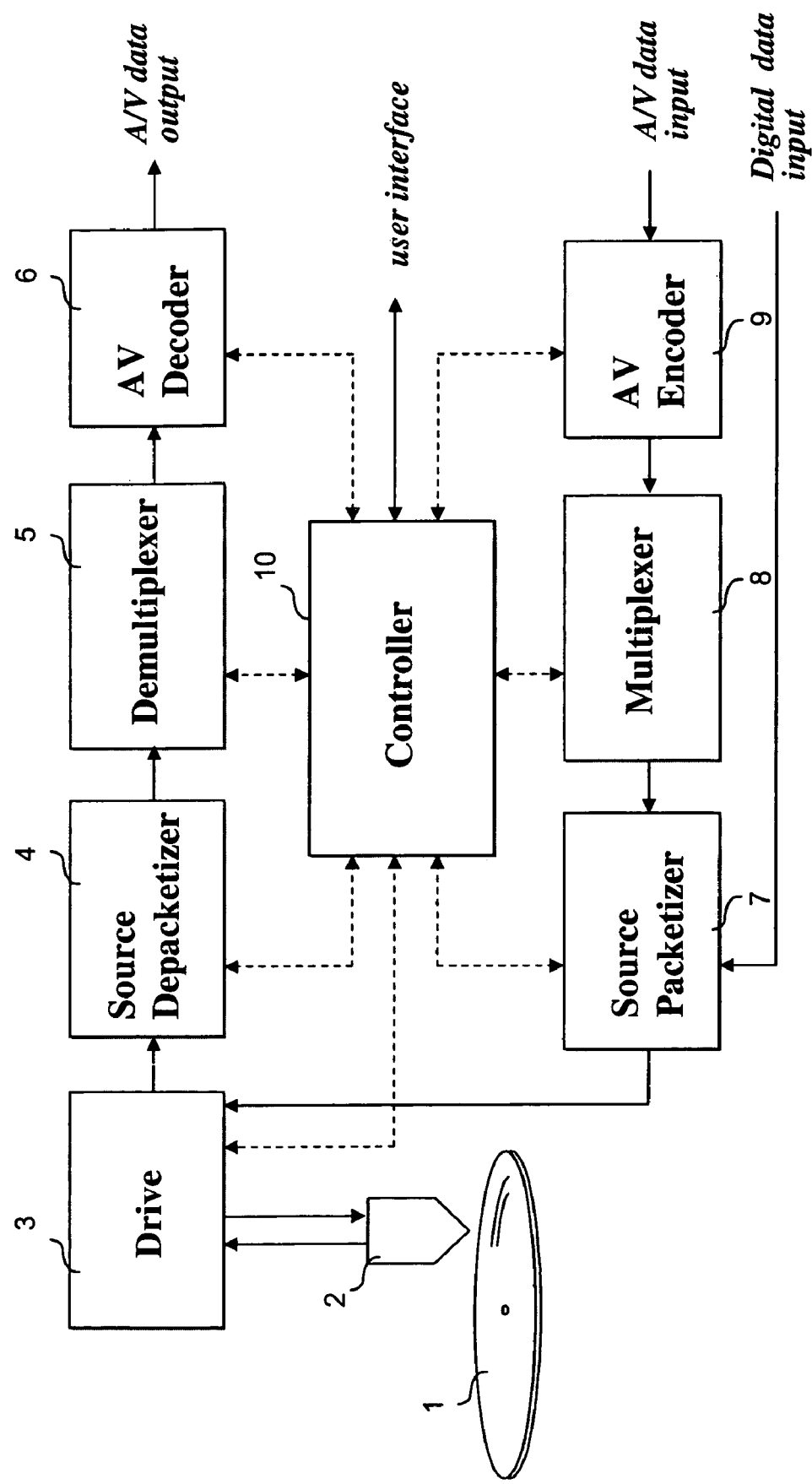
FIG. 7 illustrates a schematic diagram of an embodiment of an optical disk reproducing apparatus of the present invention.

FIG. 7 illustrates a schematic diagram of an embodiment of an optical disk recording and reproducing apparatus according to the present invention. As shown, an AV encoder 9 receives and encodes data (e.g., text subtitle data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

For example, based on information received via the user interface (e.g., instruction set saved on disk, provided over an intranet or internet by a computer system, etc.) the controller 10 controls the drive 3 to record one or more of the data structures of FIGS. 2-6 and 12 (described below) on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

When reproducing the presentation graphic data recorded on a BD-ROM 1, the controller 10 selectively presents at least one type of data among text subtitle data, BMP subtitle data, and graphic image data corresponding to the object type or object source that a user has selected.

Figure 8:
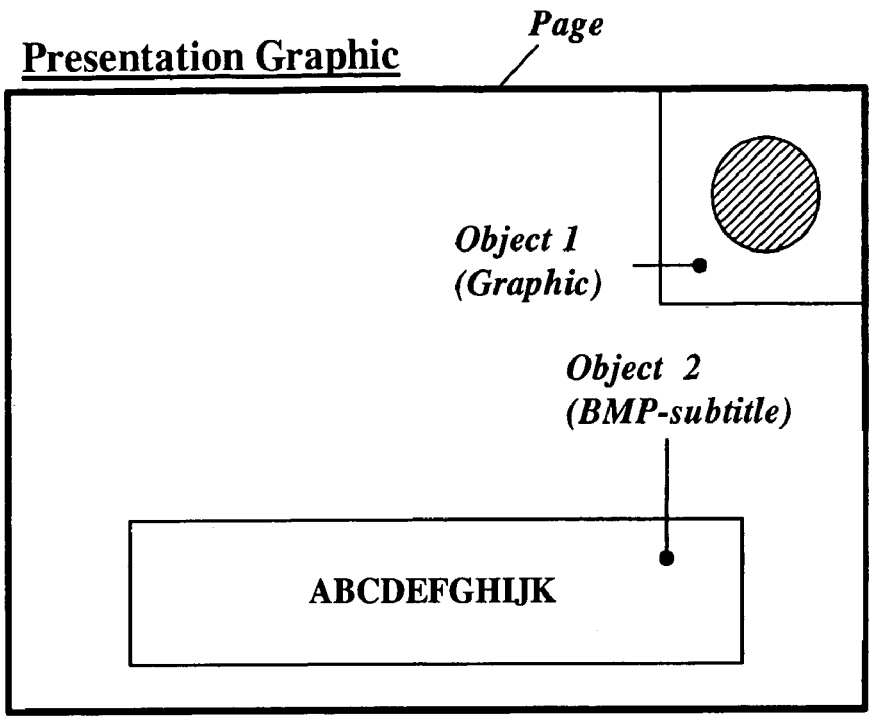
FIGS. 8-11 illustrate examples in which presentation graphic data of different types is selectively presented in accordance with the present invention.

If a user of the optical disk apparatus requests selective reproduction of the object of graphic image data and the object of BMP subtitle data, the controller 10 locates the graphic image data having the object type code '0000 0001' and the BMP subtitle data having the object type code '0000 0010' by checking the object type information included in the object data segment. The controller 10 then presents the object of graphic image data (object 1) and the object of BMP subtitle data (object 2) in one page as shown in FIG. 8.

Figure 9:
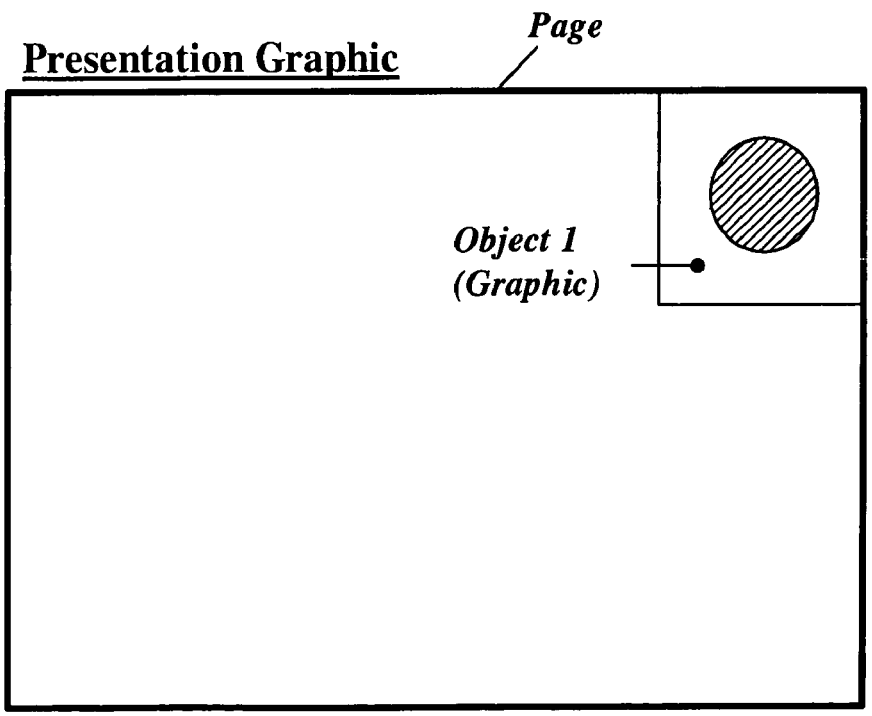

If the user requests selective reproduction of the object of graphic image data among presentation graphic data recorded on the BD-ROM 1, the controller 10 locates the graphic image data having the object type code '0000 0001' by checking the object type information included in the object data segment. The controller 10 then presents only the object of the graphic image data (object 1) in one page as shown in FIG. 9.

Figure 10:
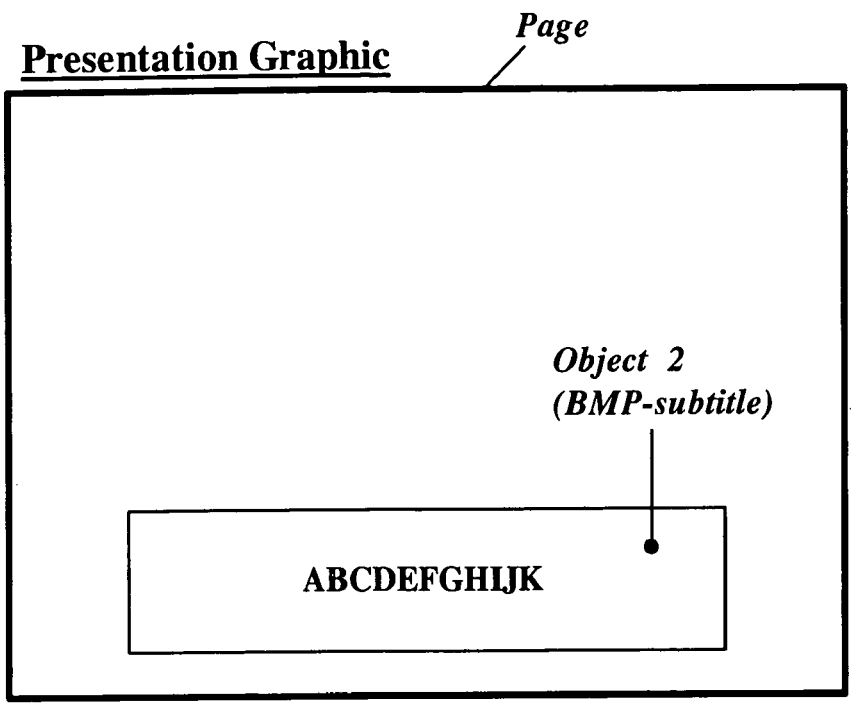

If the user requests selective reproduction of the object of BMP subtitle data among presentation graphic data recorded on the BD-ROM 1, the controller 10 locates the BMP subtitle data having the object type code '0000 0010' by checking the object type information included in the object data segment. The controller 10 then presents only the object of the BMP subtitle data (object 2) in one page as shown in FIG. 10.

Figure 11:
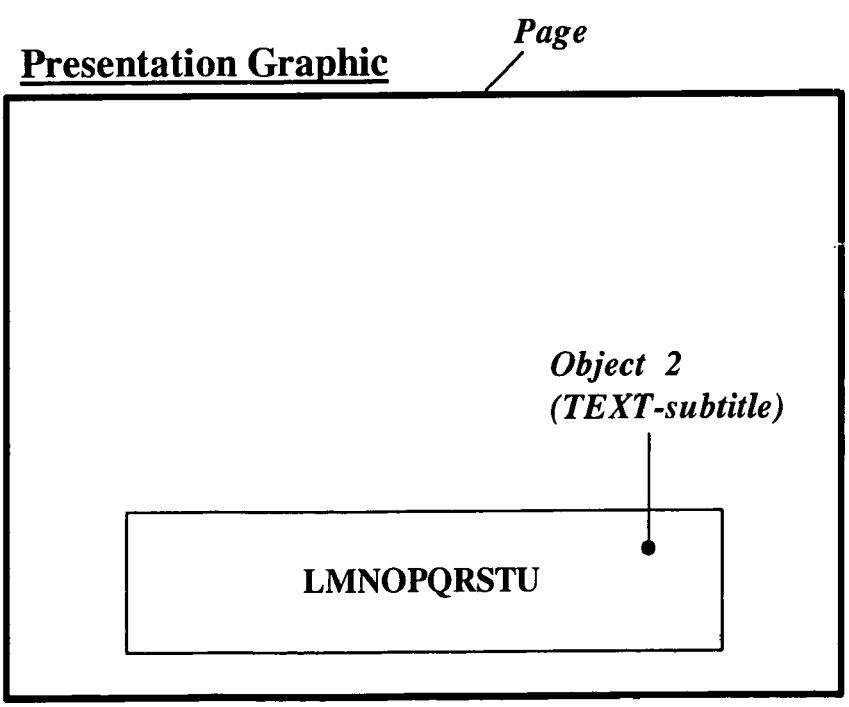

If the user requests selective reproduction of the object of text subtitle data among presentation graphic data recorded on the BD-ROM 1, the controller 10 locates the text subtitle data having the object type code '0000 0100' by checking the object type information included in the object data segment. The controller 10 then presents only the object of the text subtitle data (object 2) in one page as shown in FIG. 11. In this case, the object of the text subtitle data and the object of the BMP subtitle data may replace each other or may be displayed in different positions.

If the user requests selective reproduction of objects downloaded through a network such as the Internet instead of the objects recorded on the BD-ROM 1, the controller 10 checks the object source information and excludes objects having the code value (e.g., '0000 1111') indicative of recorded objects, thereby selectively reproducing objects that have been downloaded through the network.

The controller 10 may refer to both the object source information and object type information and reproduce an object of a particular type recorded on the BD-ROM and an object of a particular type downloaded through the network separately or simultaneously.

FIG. 12 illustrates another exemplary embodiment of the data structure for a page composition segment recorded on a high-density recording medium in accordance with the present invention. As shown, the object type information and object source information, which were included in the object data segment (ODS), are included in the page composition segment (PCS). In this case, the controller 10 of the optical disk apparatus refers to the object source and object type information included in the page composition segment (PCS) and performs the aforementioned steps for reproducing the presentation graphic data.

The present invention provides a recording medium having a data structure for managing the reproduction of subtitle data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer readable medium having an executable data structure for managing reproduction of text subtitle data by a reproducing apparatus, comprising:

an area storing at least one main AV data and a plurality of subtitle information segments, each one of the subtitle information segments being represented by a single PES packet of transport packets which includes a packet identifier for identifying a type of packet, wherein each one of the subtitle information segments includes a segment identifier identifying the subtitle information segment as one of text data and graphic data, wherein one of the subtitle information segments identified as the text data includes at most two text subtitle regions, and each text subtitle region is linked to at least one style information defined in another one of the subtitle information segments identified as the text data using an identifier, wherein the other one of the subtitle information segments identified as the graphic data is multiplexed with the main AV data into a file.

2. The non-transitory computer readable medium of claim 1, wherein a first subtitle information segment among the plurality of subtitle information segments identified as the text data includes a palette identifier identifying palette information for controlling color attributes of the subtitle area.

3. The non-transitory computer readable medium of claim 2, wherein the palette information includes the palette, a brightness value, a red chrominance value, a blue chrominance value, and a transparency value.

4. A method of recording text subtitle data on a recording medium using a recording apparatus, the method comprising:
recording a plurality of subtitle information segments on the recording medium using the recording apparatus, each one of the subtitle information segments being represented by a single PES packet of transport packets which includes a packet identifier for identifying a type of the packet, wherein each one of the subtitle information segments includes a segment identifier identifying the subtitle information segment as one of text data and graphic data,
wherein one of the subtitle information segments identified as the text data includes at most two text subtitle regions, and each text subtitle region is linked to at least one style information defined in another one of the subtitle information segments identified as the text data using an identifier,
wherein the other one of the subtitle information segments identified as the graphic data is multiplexed with the main AV data into a file.

5. The method of claim 4, wherein a first subtitle information segment among the plurality of subtitle information segments identified as the text data includes a palette identifier identifying palette information for controlling color attributes of the subtitle area.

6. A method of reproducing text subtitle data from a recording medium using a reproducing apparatus, comprising:
reproducing a plurality of subtitle information segments from the recording medium using the reproducing apparatus, each one of the subtitle information segments being represented by a single PES packet of transport packets which includes a packet identifier for identifying a type of the packet, wherein each one of the subtitle information segments includes a segment identifier identifying the subtitle information segment as one of text data and graphic data,
wherein one of the subtitle information segments identified as the text data includes at most two text subtitle regions, and each text subtitle region is linked to at least one style information defined in another one of the subtitle information segments identified as the text data using an identifier
wherein the other one of the subtitle information segments identified as the graphic data is multiplexed with the main AV data into a file.

7. The method of claim 6, wherein a first subtitle information segment among the plurality of subtitle information segments identified as the text data includes a palette identifier identifying palette information for controlling color attributes of the subtitle area.

8. An apparatus for recording text subtitle data on a recording medium, comprising:
a pickup configured to record data on the recording medium; and
a controller configured to control the pickup to record a plurality of subtitle information segments on the recording medium, each one of the subtitle information segments being represented by a single PES packet of transport packets which includes a packet identifier for identifying a type of the packet, wherein each one of the subtitle information segments includes a segment identifier identifying the subtitle information segment as one of text data and graphic data,
wherein one of the subtitle information segments identified as the text data includes at most two text subtitle regions, and each text subtitle region is linked to at least one style information defined in another one of the subtitle information segments identified as the text data using an identifier,
wherein the other one of the subtitle information segments identified as the graphic data is multiplexed with the main AV data into a file.

9. The apparatus of claim 8, wherein the controller is configured to further control the pickup to record a first subtitle information segment among the plurality of subtitle information segments identified as the text data including a palette identifier identifying palette information for controlling color attributes of the subtitle data.

10. An apparatus for reproducing text subtitle data from a recording medium, comprising:
a pickup configured to reproduce data recorded on the recording medium; and
a controller configured to control the pickup to reproduce a plurality of subtitle information segments from the recording medium, each one of the subtitle information segments being represented by a single PES packet of transport packets which includes a packet identifier for identifying a type of the packet, wherein each one of the subtitle information segments includes a segment identifier identifying the subtitle information segment as one of text data and graphic data,
wherein one of the subtitle information segments identified as the text data includes at most two text subtitle regions, and each text subtitle region is linked to at least one style information defined in another one of the subtitle information segments identified as the text data using an identifier,
wherein the other one of the subtitle information segments identified as the graphic data is multiplexed with the main AV data into a file.

11. The apparatus of claim 10, wherein the controller is configured to further control the pickup to reproduce a first subtitle information segment among the plurality of subtitle information segments identified as the text data including a palette identifier identifying palette information for controlling color attributes of the subtitle data.

12. The apparatus of claim 10, wherein the controller is configured to control the pickup to reproduce a text subtitle information segment after identifying the text subtitle information segment with the segment identifier.

13. The apparatus of claim 10, further comprising:
a depacketizer configured to convert the packet into a data stream;
a demultiplexer configured to demultiplex the data stream into an encoded data; and
a decoder configured to decode the encoded data.

14. The apparatus of claim 13, wherein the controller is configured to control the operation of the depacketizer, the demultiplexer, and the decoder.

* * * * *